United States Patent [19]

Huzyak

[11] Patent Number: 4,478,062

[45] Date of Patent: Oct. 23, 1984

[54] STRIP SHAPE MEASURING ROLL

[75] Inventor: Paul E. Huzyak, Salem, Ohio

[73] Assignee: E. W. Bliss Company, Inc., Salem, Ohio

[21] Appl. No.: 413,863

[22] Filed: Sep. 1, 1982

[51] Int. Cl.$^3$ .............................................. B21B 37/06
[52] U.S. Cl. .......................................... 72/17; 72/11
[58] Field of Search ................................ 72/17, 10, 11

[56] References Cited

U.S. PATENT DOCUMENTS

| | | | |
|---|---|---|---|
| 2,674,127 | 4/1954 | Garrett et al. | 73/159 |
| 3,078,747 | 2/1963 | Pearson | 80/56 |
| 3,334,508 | 8/1967 | Martin | 72/364 |
| 3,499,306 | 3/1970 | Pearson | 72/17 |
| 3,702,208 | 11/1972 | Habermann et al. | 308/10 |
| 3,787,100 | 1/1974 | Habermann et al. | 308/10 |
| 4,114,960 | 9/1978 | Habermann et al. | 308/10 |
| 4,121,143 | 10/1978 | Habermann et al. | 318/629 |
| 4,262,511 | 4/1981 | Boisvert et al. | 72/17 |

OTHER PUBLICATIONS

Magnetic Bearing With Active Control, vol. 6, NASA Tech. Briefs, No. 2, GSC-12582.
Magnetic Bearing Consumes Low Power, vol. 6, NASA Tech. Briefs, No. 2, GSC-12517.
Introduction to Active Magnetic Bearings, Societe de Mecanique Magmetique Active Magnetic Bearings a Significant Step Forward in Shaft Support Technology, SKF Industries, Inc. ©1979.

Primary Examiner—Lowell A. Larson
Assistant Examiner—Jorji M. Griffin
Attorney, Agent, or Firm—Body, Vickers & Daniels

[57] ABSTRACT

A system is provided for measuring the shape of sheet stock within a rolling mill. The system includes a shape sensing roll including a plurality of roll segments. Each segment includes a magnetic bearing, the stators thereof being mounted to a stationary shaft. The bearing rotors are mounted in a steel ring which contacts the strip to be measured. Each roll segment is suspended by a magnetic bearing which is free to react to the loading placed thereon, independent of adjacent segments. Since the magnetic bearing system automatically regulates the power supplied to the electromagnets of the respective bearings to maintain their concentric positions, changes to the power inputs are a direct indication of the magnitude of the loading thereon.

2 Claims, 4 Drawing Figures

STRIP SHAPE MEASURING ROLL

BACKGROUND OF THE INVENTION

1. Field of the Invention

The field of the invention relates to a measuring roll for measuring the tension of a strip passing thereover, said tension being related to the shape or flatness of the strip.

2. Brief Description of the Prior Art

In cold rolling sheet stock, the amount of work performed on a sheet cross section determines the quality of the product. If excess work is performed in the center of the stock, the center elongates longitudinally more than the edges and therefore buckles in the center. The converse is true if excess work is performed at the edges.

Many factors, such as quality of input stock, localized heating of the mill roll faces, or deflection of the rolls, influence these cold work variations. Since the strip is reduced not only by roll compression but also by the high tensile loads applied with the coiler, these defective areas are difficult to detect until the coil is complete. The defects that are detected during rolling are compensated for through manual adjustment of the rolling mill or through the application of coolant to the roll faces. It is important that defects be substantially reduced, if not eliminated entirely, because those areas of the sheet stock outside the acceptable flatness limits must be scrapped with resulting economic loss.

Shape sensing rolls have been developed to monitor the rolling mill output. U.S. Pat. No. 3,499,306 discloses one such roll which is pneumatically operated. Mechanical bearings have also been employed for this purpose. Both types operate in conjunction with control systems for making adjustments in the rolling mill in response to changes in detected strip tension.

Metal strip on the delivery side of a mill is tensioned at as much as 1,000 lbs. per inch of width, nominally 25,000 to 50,000 lbs. The shape sensing roll is positioned to provide a selected wrap angle of the strip thereover. A component of the strip tension then becomes a reaction force on the roller face. The roller is divided into segments that react independently to measure this tensile force component at a given point across the sheet. If these forces are known, adjustments can be made to the rolling mill to level out the force differentials using two techniques: roll bending and roll temperature control (by selective coolant spray).

The presently available measuring rolls have various shortcomings which may tend to limit their application to various measurement applications. Pneumatic bearings, for example, have an inherently low load carrying capacity which requires delicate instrumentation and control components to achieve the intended function.

Load cell measuring equipment is characterized by non-linearity, dead band, hysteresis, and minimum load levels for accurate measurement. Such equipment includes a series of ring assemblies mounted to a common shaft. Each ring assembly includes a ground ring press fit onto the outer roll of a roller bearing. The inner bearing race is press fit to a collar which is machined to accept a load cell contacting the inner bearing race. Vertical loads applied to the outer ring are transmitted to the load cell and directly monitored.

In view of the above, it is an object of the present invention to provide a system which is capable of successfully operating under a wide range of loads with a high degree of accuracy.

SUMMARY OF THE INVENTION

The invention provides a measuring roll including a series of active magnetic bearings independently mounted on a shaft. Through appropriately designed electronics, the magnetic bearings can be given an apparent mechanical spring rate. Each is free to react to the load placed thereon independent of the adjacent bearings. Power is automatically supplied to the electromagnet of each bearing to maintain its concentric position with respect to a given axis. Changes in the power inputs are a direct indication of the magnitude of the individual loads. Since the bearing load is proportional to strip tension, the power supplied to each bearing is proportional to strip tension.

Alternatively, means may be provided to produce an electrical signal, the magnitude of which is proportional to the displacement of a first bearing member with respect to a second member thereof.

Either of the above systems may be employed in conjunction with a strip shape measuring roll comprising a series of active magnetic bearings to provide an electrical signal which is indicative of local strip tension and therefor strip shape. The signal can, via a microprocessor, be used to control roll bending cylinders and/or roll coolant spray headers in the mill stand to alter the roll contour.

Advantages of the magnetic bearing system include: (1) the absence of wear in the bearing since no mechanical contact is made between moving surfaces; (2) since no mechanical contact is made, resistance to rotation is low and no lubrication is required; (3) mechanically generated heat build-up is negligible; (4) high rotational speeds are attainable; (5) the control system can operate accurately with little or no deflection of the roll segments; and (6) breakage of the strip being measured is unlikely to cause significant damage to the system.

DETAILED DESCRIPTION OF THE INVENTION

The invention provides a system for measuring the shape of a strip of material. A strip shape measuring roll is employed for measuring the tension of a strip passing thereover. The roll includes a plurality of coaxial magnetic bearings. Since the bearing load is proportional to strip tension, the strength of the electric signal required to center each bearing is proportional to local strip tension. The local strip tension on a bearing is indicative of strip shape, and the electrical signal may accordingly be used to indicate said shape.

Magnetic bearings include three basic components: the rotor, the stator, and the electronic control system. The rotor is the rotating part of the bearing and is composed of ferromagnetic material. The stator contains powerful electromagnets and position sensors. The electromagnets generate the magnetic force which causes suspension of the rotor. The sensors continously monitor the position of the rotor with respect to the stator and send signals to the control system. The control system regulates power to the electromagnets in response thereto. An active magnetic bearing which operates in such a manner is disclosed in U.S. Pat. No. 4,114,960. This patent also discusses several known devices for detecting radial movement of a rotor relative to a stator.

Systems have been developed for keeping the rotor in a desired radial position. U.S. Pat. No. 4,121,143 provides a system for compensating for synchronous disturbances due to defects in rotor symmetry or other causes. U.S. Pat. No. 4,114,960 discloses a device for detecting radial displacement of a rotor relative to a stator and creating a restoring force for correcting the positioning of the rotor. A pair of magnetic bearing assemblies are disclosed in U.S. Pat. No. 3,787,100 for supporting a rotating member such as a gyroscope. The teachings of the above three patents are incorporated by reference herein.

The present invention is directed to a system which measures the restoring signal necessary for correcting the position of a rotor, and uses this measurement as an indication of the tension of a strip exerting force upon the rotor. A plurality of magnetic bearings are employed across the width of the strip. If the strip tension is not the same for all bearings, it must follow that the strip has an uneven profile. The appropriate adjustments can be made in the rolling mill to correct for such defects in the strip.

Figure 1:
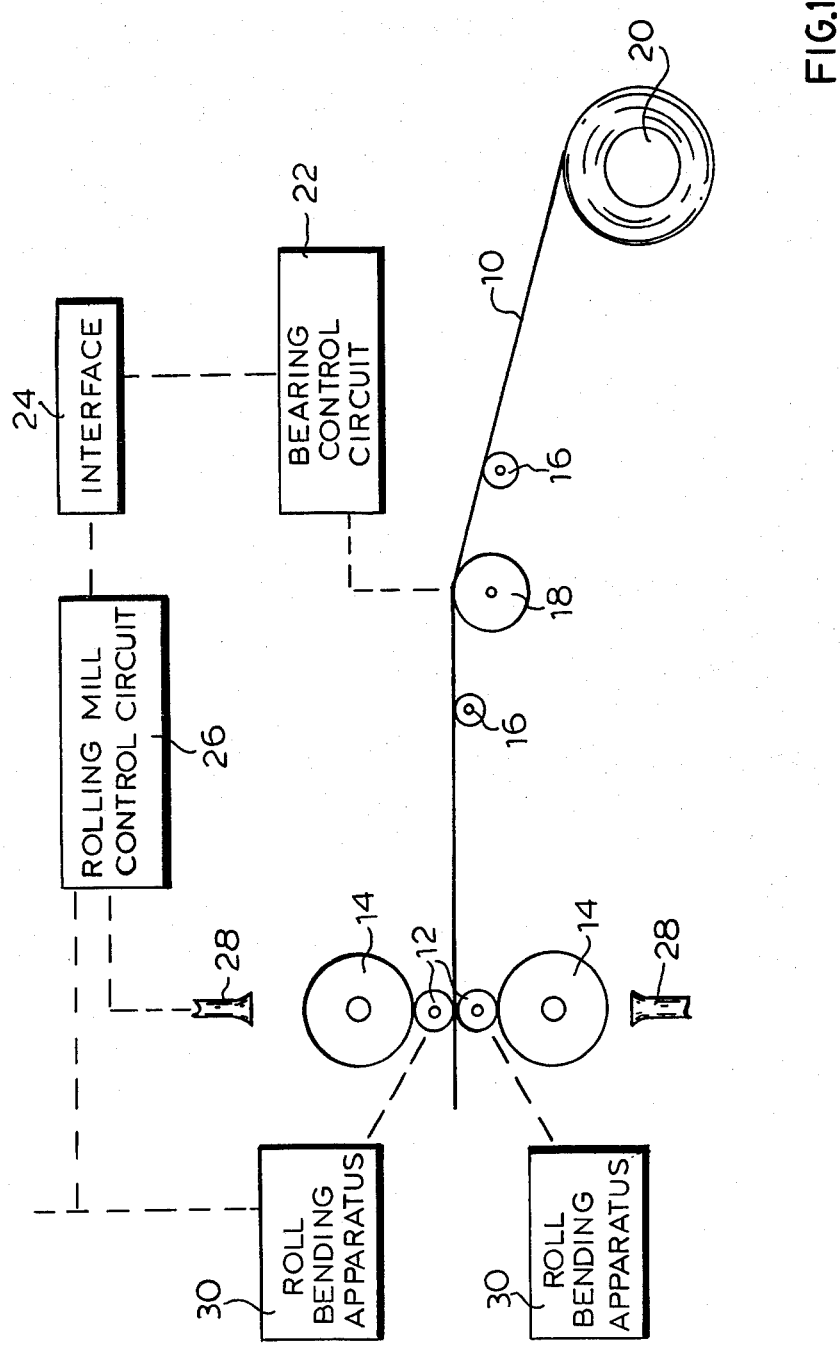
FIG. 1 is a schematical illustration of a rolling mill including a shape sensing roll.

Referring to FIG. 1, a system according to the invention is schematically illustrated. A strip 10 of metal such as steel or aluminum passes between a pair of work rolls 12. If desired, the invention may be employed between two parallel sets of work rolls such as are found in multi-stand rolling mills. The work rolls 12 are positioned between a pair of back-up rolls 14. A pair of idler rolls 16 may be provided for guiding the strip 10 over a shape sensing roll 18. After passing over the shape sensing roll 18, the strip 10 is wound upon a coiler 20.

As discussed above, it is important for the strip 10 to have a uniform transverse tension which is indicative of a uniform transverse thickness upon emerging from between the work rolls. The shape sensing roll 18, which includes a series of coaxial active magnetic bearing assemblies, will detect transverse deviations in strip tension. A plurality of roll segments, each including one magnetic bearing, comprise the shape sensing roll. Each segment contacts a portion of the width of the strip over a selected wrap angle. This angle can be adjusted by means of the idler rolls 16.

If the strip is of uneven transverse thickness, a greater force will be exerted upon some roll segments than on others. A bearing control circuit 22, similar to those employed in the patented structures discussed above, sends electronic signals to the electromagnet of each bearing in order to maintain the relative positions of the rotors and stators as detected by the position sensors. Since the force exerted on some segments is greater than on others, the electronic signals sent to the respective bearings are of different magnitude. The magnitude of each of the signals is noted by an interface circuit 24. For example, the bearing may be constructed such that a range of 0-10 volts is required to counteract a force of 0-1000 pounds of pressure exerted thereon. The correlation of voltage and pounds is not colinear throughout the range. The relationship can be programmed and stored in a memory circuit to provide an accurate indication of the force exerted on each roll segment.

In order to center the rotors with respect to the stators, the electromagnets within the bearings must act in two (x and y) directions. The sensors will accordingly provide the control circuit 22 with two signals per bearing representing the load data for the x and y axes. The control circuit 22 in turn sends the necessary electronic signals to the electromagnets. U.S. Pat. No. 3,702,208 desribes a bearing which operates generally in this manner although the electromagnets are positioned on the outer of two concentric members. The invention goes a step further in that the analog signals generated by the bearing control circuit are tapped by the interface circuit 24, their magnitude determined, and the necessary adjustments are made within the rolling mill.

The interface circuit 24 includes a microprocessor which scans the analog signals to the bearings comprising roll 18, digitizing the value of each when scanned. Parallel to serial conversion of the signals then takes place, one at a time. The signals are mulitiplexed and transmitted as serial data to a rolling mill control circuit 26.

The deviation from the norm of each of the roll segments is determined by summing all of the output analog signals from the bearing control circuit and dividing by the number of inputs to establish the mean. Subtracting the total value of each input will determine the minimum/maximum deviation of each signal. All deviations are digitized, multiplexed, and fed to the rolling mill control circuit. An accurate profile of the tension across the strip can accordingly be calculated.

A uniform tension profile across the strip is generally desirable. In order to correct for deviations, the rolling mill control circuit selectively actuates coolant sprayers 28 and/or roll bending apparatus 30 to cause more or less work to be performed on selected portions of the strip 10. The sprayers and roll bending apparatus are well known to the art and require no further description.

The system may also include means for measuring the speed of the strip as it passes over the shape sensing roll. Since there is almost no internal friction within each magnetic bearing, rotation of the rotors can occur without slippage. The rotational speed of the rotors can be translated to the linear speed of the strip. The strip speed is ordinarily in the range of 2000-6000 feet per minute.

Total strip tension is calculated by using the wrap angle and the sum of measured roll forces. The strip tension to roll segment force relationship is adjustable by positioning the rolls 16 at either side of the shape sensing roll.

Figure 2:
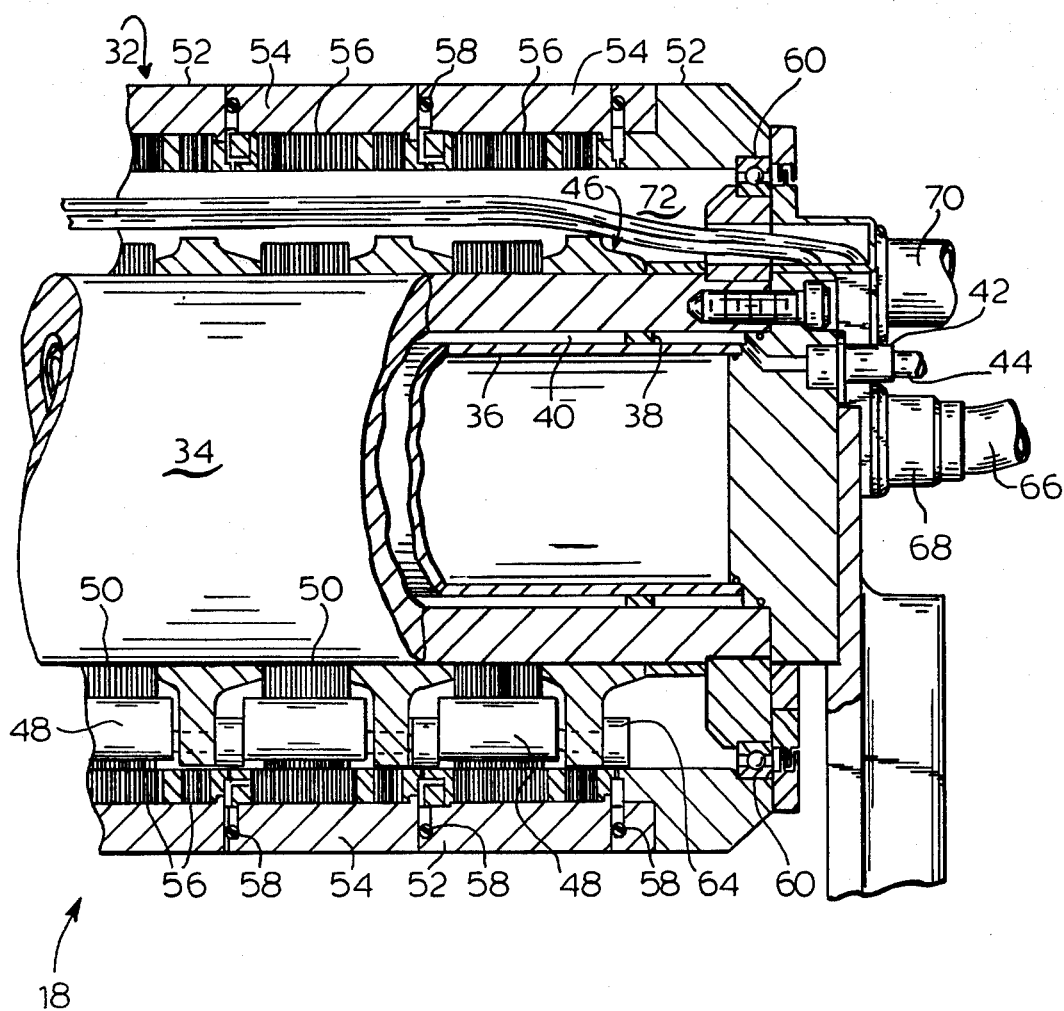
FIG. 2 is a partially sectional view of a portion of a shape sensing roll including coaxial roll segments.
Figure 3:
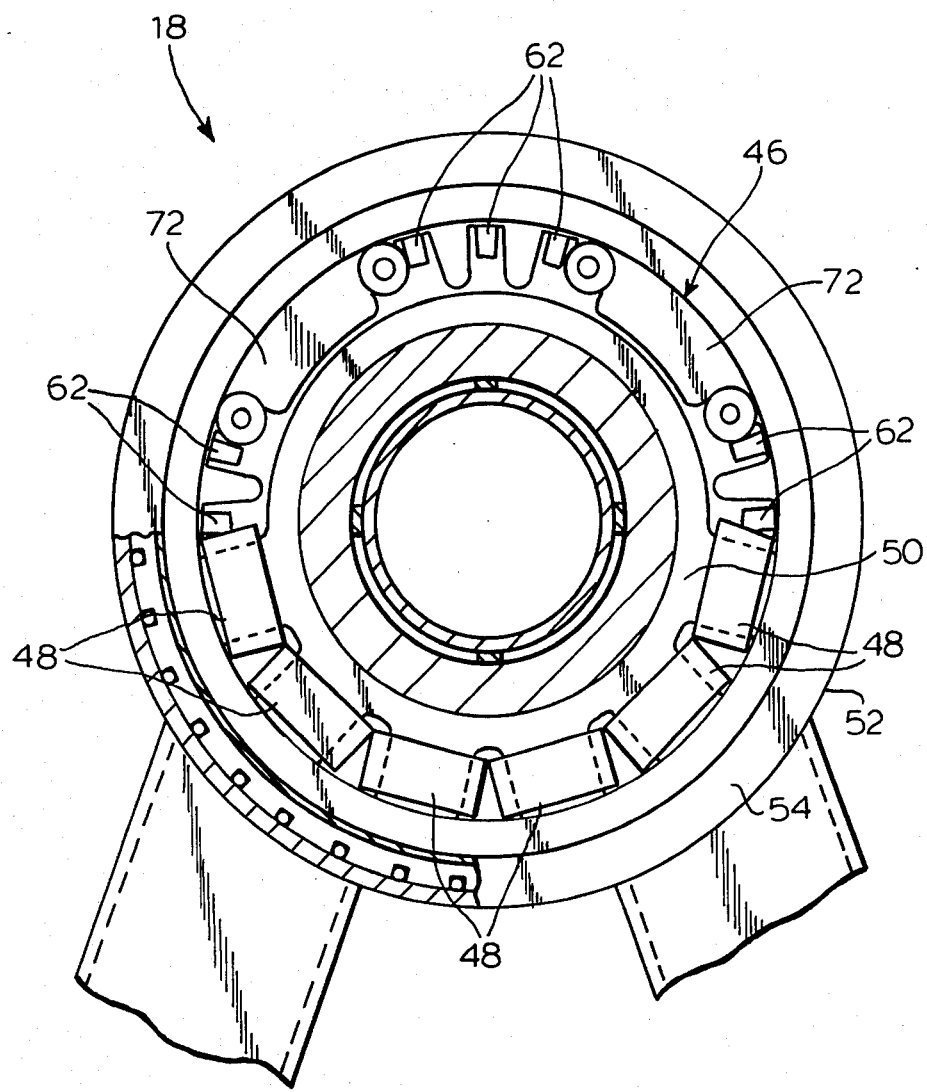
FIG. 3 is a cross sectional view illustrating one of the roll segments shown in FIG. 2.

FIGS. 2 and 3 illustrate a specific shape sensing roll which may be employed in accordance with the invention. The roll 18 includes a plurality of substantially identical roll segments 32, each of which is mounted to a common stationary support shaft 34. The segments may each be about four inches in length. The shaft 34 is in turn mounted to a second cylindrical shaft 36 and is separated therefrom by a plurality of spacer elements 38. A cylindrical chamber 40 is defined between the two shafts through which gaseous or liquid coolant may flow. A coolant connector 42 and hose 44 are mounted to one end of the roll 18 to supply coolant to the chamber 40.

Stators 46 are mounted to the support shaft 34. Each includes a plurality of windings 48 mounted thereon and a stack of magnetic metal laminations 50. Rotors 52 are magnetically suspended about the stators when power is supplied to the stator windings 48. The windings 48 are located towards the bottom of each bearing and create an attractive force between the rotors and stators. Strip tension applied at the top of each bearing will tend to separate these members near the bottoms thereof. Each rotor includes a hardened outer ring 54 having magnetic laminations 56 secured to the inner surface thereof. To minimize thrust drag, each of the rotors are separated by rotor separating balls 58. A bearing 60 is provided at each end of the roll 18 for axial positioning of the rotors.

In view of the high rpm of the rotors, bearing 60 and separatng balls 58 may be eliminated. The length of roll 18 exceeds that of the strip passing thereover and the end portions thereof accordingly need not rotate. The separating balls 58 may be replaced by air gaps supplied with pressurized gas. U.S. Pat. No. 3,499,306 discloses such an arrangement in FIG. 8 thereof. Pneumatic bearings employed for other purposes have also used presurized fluids as a means for maintaining or adjusting the axial positions thereof.

A plurality of radial position sensors 62 are attached to the stator. These members sense the position of the rotor with respect to the stator so that the electromagnetic portions of the stators may be actuated by control circuit 22 to maintain their relative concentricity. To prevent the rotors from contacting the stators when either the current to the electromagnets is shut off or the bearings are subjected to sudden overloading thereon, a plurality of static support rolls 64 are mounted to the stators 46.

In lieu of or in addition to support rolls 64, one or more cylindrical backup rolls may be mounted beneath and external to the roll segments. Each backup roll would have an axis parallel to that of the strip sensing roll and be positioned therefrom a distance which is less than the gap between the stators and rotors. The gap is approximately 0.8 mm.

The stators 46 each include at least one cut out area through which electrical conductors leading to the electromagnetic windings 48 and the sensors extend. The conductors are contained within wire harnesses 66. A wire harness connection 68 is mounted to one end of the shape sensing roll. The harness(es) is connected to the bearing control circuit 22.

A compressed air connection 70 is also provided at one end of the shape sensing roll. Air may be introduced into the cut-out areas 72 of the stators for cooling and debris purging. The cut-out areas are axially aligned to facilitate the passage of the electrical conductors and allow air to pass through the entire shape sensing roll.

Figure 4:
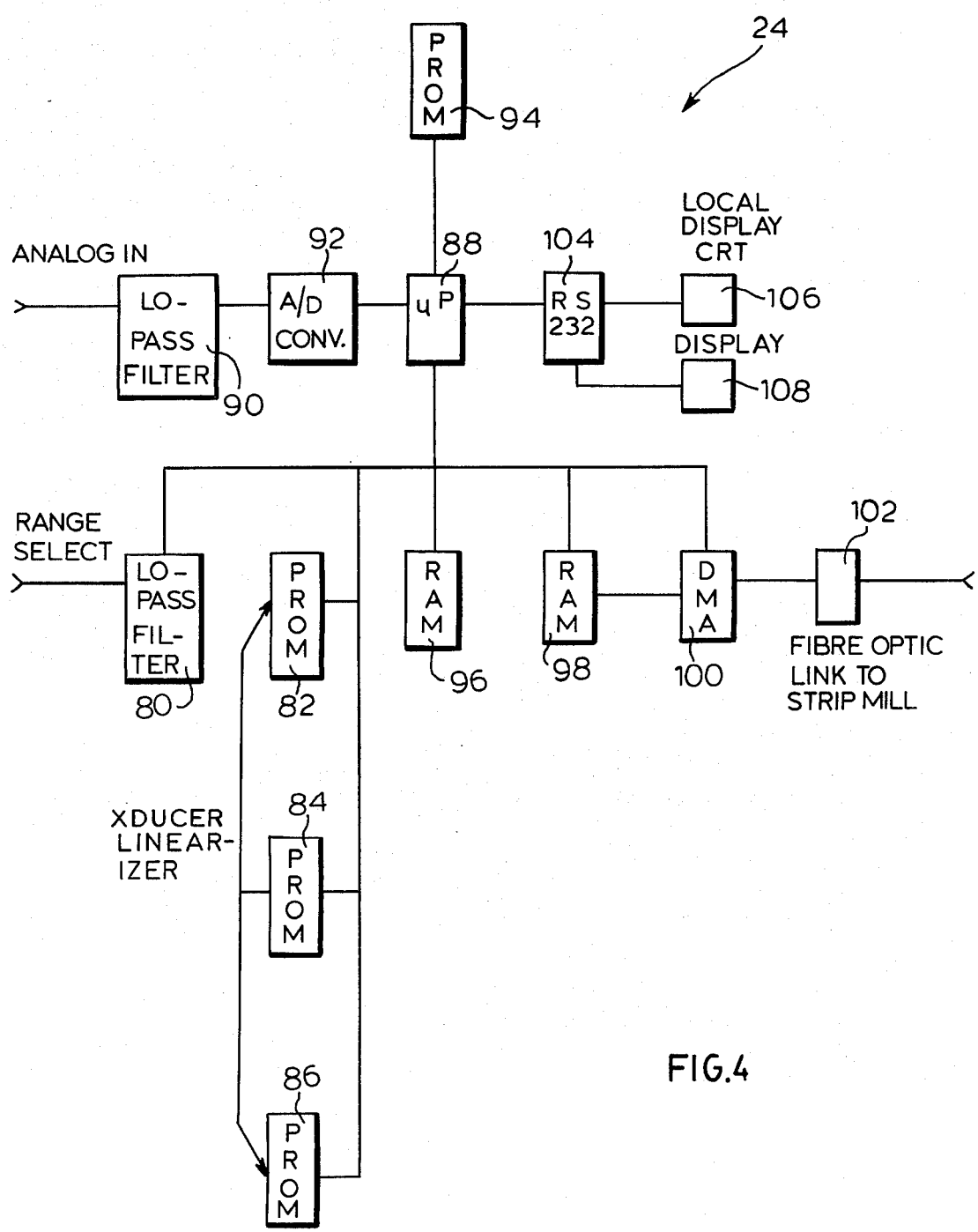
FIG. 4 is a schematical illustration of a data processing system for controlling a rolling mill by means of a shape sensing roll.

The interface circuit 24 which receives analog signals from the bearing control circuit 22 is illustrated in FIG. 4. Since the bearings may be subjected to a wide variation of loads, the control circuit operates in one of several different power ranges for maintaining the rotors in concentric positions relative to the stators. The circuit operates in such a manner that the output to the interface circuit 24 is always between zero and ten volts. In the system described herein, there are three control circuit ranges. Depending on the load exerted upon an individual roll segment, the control circuit operates in one of these ranges. A selector switch may be provided for this purpose. The particular range is inputted into the interface circuit 24 through a low pass filter 80. A transducer linearizer comprising PROMs 82,84,86 is provided for storing tables which convert raw data from the control circuit 22 to linear values. Three such tables are provided, each being operable for one of the three ranges. The position of the control circuit selector switch is noted by the interface circuit such that the appropriate PROM is utilized when converting data.

A microprocessor 88 is provided for running the conversion cycles. The analog input representing the force exerted upon each roll segment passes through a low-pass filter 90 and into a twelve-bit A/D conversion circuit 92. The inputs from all sixty-four channels are multiplexed into one set of signals and converted from analog to digital values. These values are compared with those stored on one of the PROMs.

The microprocessor 88 is controlled by a control program within a PROM 94 which stores the operating sequence for running the system. The local storage necessary to operate it is provided by a random access memory 96. A second random access memory 98 stores the output after it is linearized in the microprocessor. A direct memory access 100 transfers blocks of data between thirty and forty Hertz. In other words, data representing the force across the entire shape sensing roll 18 is transmitted about every twenty-five milliseconds. A fiber-optic link 102 is employed for transmitting this data to the rolling mill control circuit 26.

One or more display units may be provided for enabling the mill operator to visually observe a representation of the strip profile. An RS-232 link 104 connects the microprocessor with a CRT display unit 106 and a digital unit 108.

What is claimed is:

1. In a system for controlling the forces exerted on a metal strip as it is being pulled by a coiler between work rolls in a given path extending between the work rolls and said coiler, said system including an elongated shape sensing roll extending generally perpendicular to said path between said work rolls and said coiler with a lower side opposite to said path; means for passing said strip over said sensing roll at a preselected wrap angle whereby the tension in said strip between said work rolls and said coiler causes a corresponding applied force between said strip and said sensing roll in a direction toward said lower side; said sensing roll including a plurality of axially spaced elements each having a rotatable ring with an outer surface rotatable about a common axis with said outer surfaces being aligned when said rings are in their normal positions and with each ring surface adapted to engage said strip at the side of said roll opposite to said lower side, feed back means developing a signal for each of said axially spaced elements, said signals having magnitudes indicative of displacement of each ring from its normal position with respect to said common axis; and, means responsive to said signals for controlling said work rolls to control the forces exerted on said strip, the improvement comprising: each of said axially spaced elements of said sensing roll being an independent, active magnetic bearing having an inner generally fixed element for supporting one of said rotatable rings, each of said fixed elements having magnetic elements adjacent said lower side only for pulling one of said rings in a direction opposite to the direction of said applied force; each of said magnetic bearings having (a) means for preventing engagement between said fixed element and said rotatable rings and (b) means for sensing the spacing between said fixed elements and said rotatable ring of each bearing; means for linearizing said displacement indicative signal to generate a corrective signal indicative of the applied force between said fixed element and said rotatable ring of each bearing; means for magnetically supporting said ring by a variable magnetic force exerted in a direction toward said strip in accordance with the magnitude of said corrective signal whereby said rings of each of said magnetic bearings are held in said normal position with said outer surfaces concentric with said axis and means for controlling the rolls in accordance with exerted magnetic force.

2. The improvement as defined in claim 1 wherein force controlling means includes means for changing said rolls to shape selected portions of said strip as it passes through said work rolls.

* * * * *